United States Patent [19]
Wilcox

[11] 3,748,062
[45] July 24, 1973

[54] SELF ENERGIZING VALVE MEANS FOR FLUID TRANSLATING DEVICE

[75] Inventor: John P. Wilcox, Columbus, Ohio
[73] Assignee: J. I. Case Company, Racine, Wis.
[22] Filed: July 21, 1971
[21] Appl. No.: 164,597

[52] U.S. Cl. .............................................. 418/177
[51] Int. Cl. ......... F01c 1/00, F03c 3/00, F04c 1/00
[58] Field of Search ............ 418/177, 175, 186–188; 137/109, 110

[56] References Cited
UNITED STATES PATENTS

| 154,231 | 8/1874 | Dietz | 418/186 |
| 3,391,609 | 7/1968 | Schmitz | 418/177 |
| 3,403,599 | 10/1968 | Guinot | 91/491 |
| 3,593,621 | 7/1971 | Praddaude | 91/492 |
| 3,635,605 | 1/1972 | Hall | 418/32 |
| 3,639,093 | 2/1972 | Jansson | 418/177 |

Primary Examiner—William I. Freeh
Assistant Examiner—John T. Winburn
Attorney—Max Dressler et al.

[57] ABSTRACT

A self energizing valve for use in controlling the flow of fluid to a fluid translating device having inner and outer members cooperating to define an annular space and being relatively rotatable by flowing fluid through a plurality of passageways communicating with the annular space. The self energizing valve slides in a valve bore and is automatically maintained in a first position by the pressure of fluid flowing through a fluid passage in the valve communicating with the passageways. The valve and bore cooperate to define a cavity and the fluid passage is connectable to the cavity and the pressure of the fluid in the cavity will move the valve from the first position.

15 Claims, 4 Drawing Figures

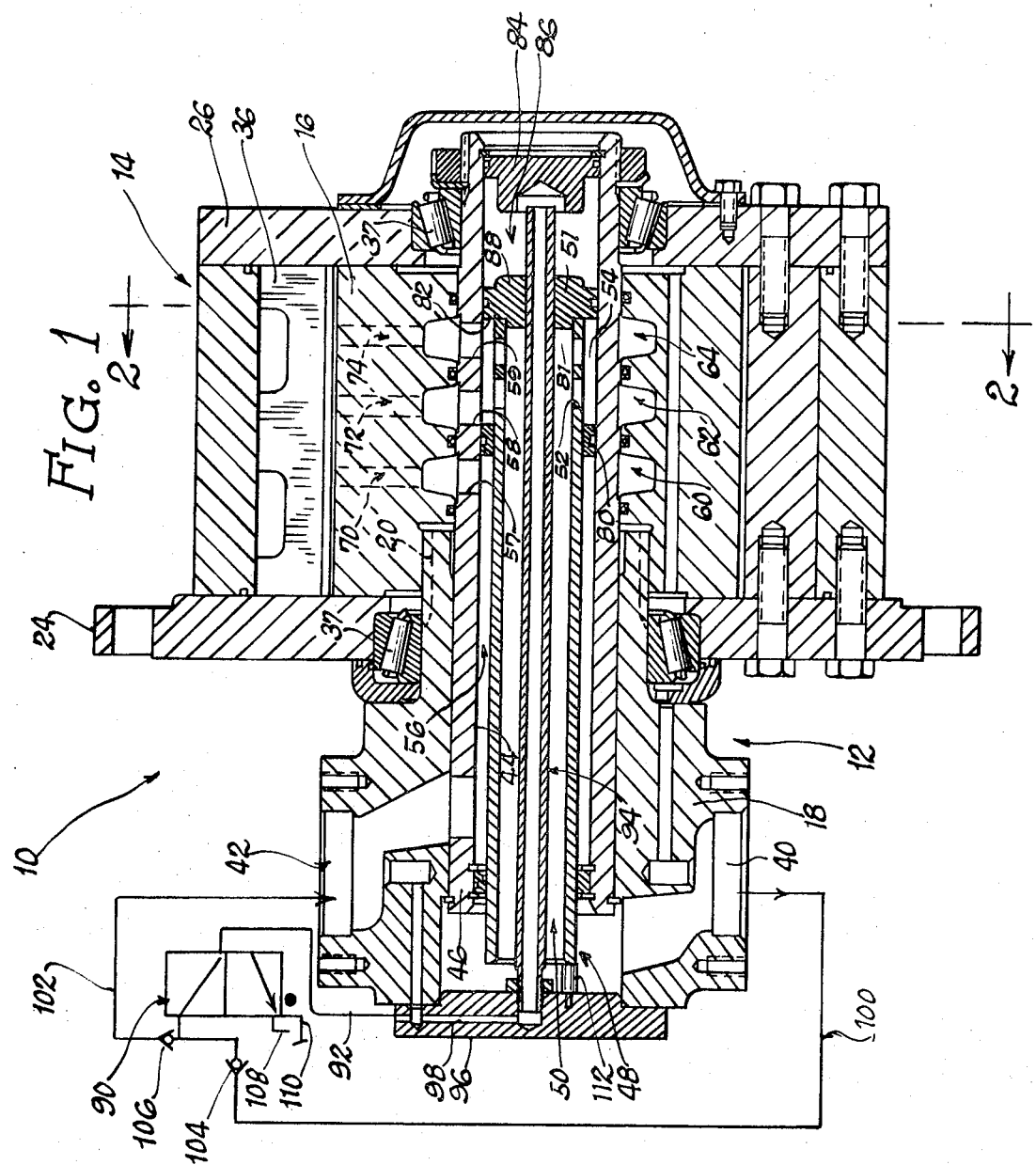

Patented July 24, 1973
3,748,062
2 Sheets-Sheet 2
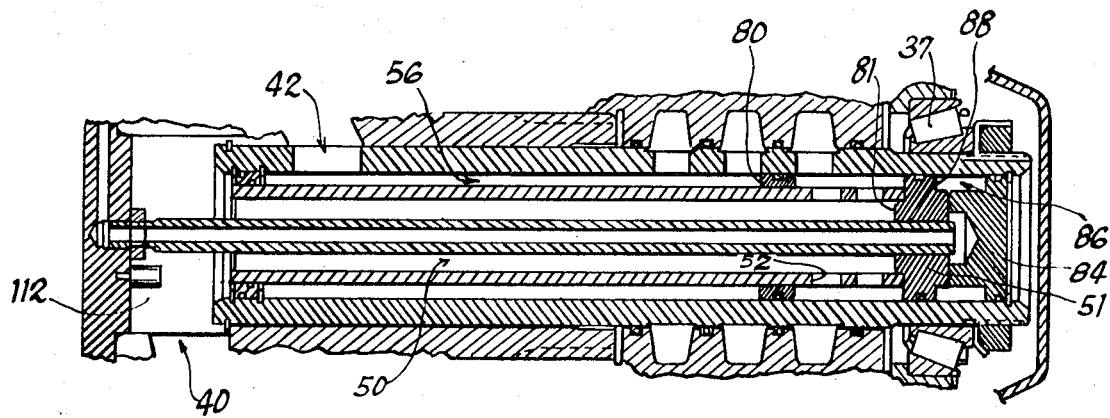
FIG. 3
FIG. 4
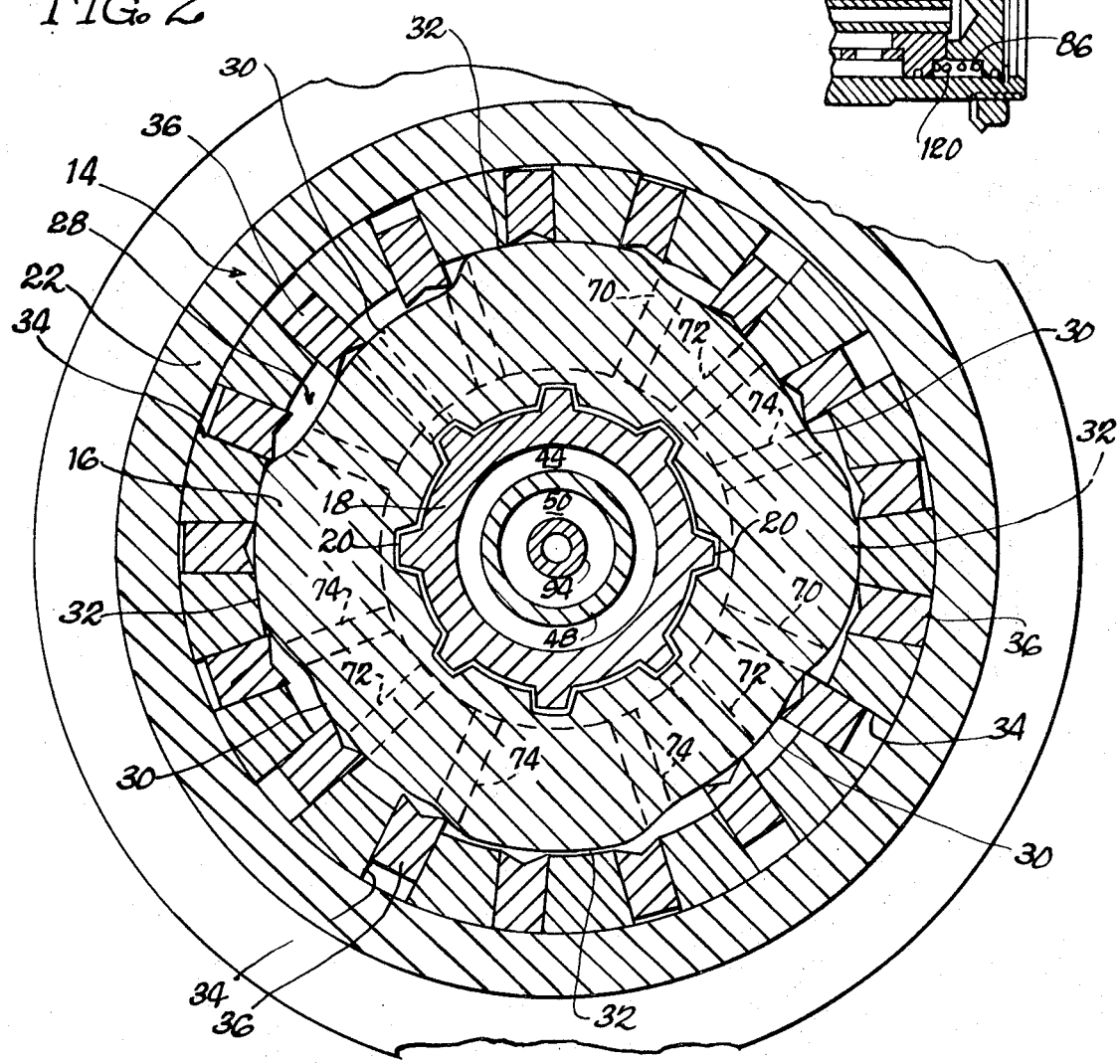
FIG. 2

SELF ENERGIZING VALVE MEANS FOR FLUID TRANSLATING DEVICE

BACKGROUND OF THE INVENTION

The present invention relates generally to fluid translating devices of the type disclosed in U.S. Pat. No. 3,391,609 and more particularly to an improved valve for controlling the flow of fluid in such translating devices.

Fluid translating devices of the type disclosed in the above mentioned patent are generally referred to as Vane-type fluid motors. These fluid motors generally consist of two relatively movable members that have surfaces that cooperate to define an annular space and fluid is directed to the annular space to cause relative rotation between the members.

Normally the annular space is divided into a plurality of pulsing sections by forming the surface on one of the members of irregular contour having lobes and depressions. The pulsing sections may be termed working chambers through which fluid is directed from a pair of flowpaths defined in a valve incorporated within the fixed member of the translating device. The flow paths are connected to the working chambers through a plurality of passageways and the valve is movable within the fixed element to vary the number of passageways in communication with the respective flow paths. With this arrangement the speed of rotation and amount of torque developed on the rotating element can be varied by varying the communication of the respective passageways with the flow paths.

The above mentioned patent discloses one mechanism for moving the valve means between positions which has found a degree of success in areas where the translating device is located on a position to be readily accessible by the operator. However, in some instances it may be necessary to actuate the valve through some remotely controlled mechanism and a mechanical mechanism is not desirable since it requires linkage connection to the valve. One arrangement eliminating the mechanical linkage connection is disclosed in application Ser. No. 27,823 filed Apr. 13, 1970 by Birger F. Jansson, now U.S. Pat. No. 3,639,093, and assigned to the assignee of the present application.

In the mechanism disclosed in the above mentioned application, the valve means is moved from a first to a second position through the use of an external control pressure applied to a cavity adjacent the valve means. While such an arrangement has proven satisfactory for use in certain environments, some applications of fluid translating devices require the development of extremely high torque forces between the fixed and the movable element. The development of high torque forces results in extensive pressurization of the entire fluid control system. Since the fluid control system includes the movable valve means as well as many seals, all of which are under pressure, the arrangement disclosed in the above mentioned application requires the development of extremely high control pressure for moving the valve spool.

SUMMARY OF THE INVENTION

The present invention comtemplates controlling the movement of the valve incorporated into a fluid translating device exculsively from the pressure of fluid developed during movement of the translating device. This arrangement eliminates the need for a separate control pressure of fluid or alternatively a mechanical linkage arrangement between the control valve and a remote operator's station.

According to the invention, the control of the flow of fluid through an annular chamber defined between inner and outer relatively movable members includes valve means that define flow paths to a first group of passageways communicating with the annular chamber, and from a second group of passageways allowing the fluid to exit from the chamber. The valve is normally maintained in a first position by the pressure of the fluid flowing through the fluid passage to cause relative rotation between the two members. The valve means has a surface cooperating with one of the members to define a cavity and the present invention contemplates flow control means for selectively placing the fluid passage in communication with the cavity to move the valve spool to a second position, thus changing the number of passageways in the respective groups. This arrangement will change the flow rate to and from the working chamber.

More specifically, the fixed member has a bore communicating with the passageways and with a pair of ports at a location spaced from the passageways. The valve means is slidable in the bore and cooperates therewith to divide the fluid passage into first and second flow paths between the respective ports and the passageways. The bore and the end surface of the valve means cooperate to define the cavity while the valve means has two additional surfaces that are in communication with the respective flow paths. The exposed surfaces respectively in communication with the first and second flow paths define first means cooperating with the valve means to maintain the valve means in a first position in response to the pressure of fluid in the flow paths.

The flow control means for selectively placing the fluid passage in communication with the cavity consists of a two position valve having a first conduit communicating with the cavity and second and third conduits connecting the respective flow paths to the control valve with unidirectional check valves cooperating with the second and third conduits to accommodate flow from the flow paths to the control valve and prevent flow from the control valve to the second and third conduits.

The control valve has a first position blocking flow between the conduits and exhausting the fluid from the first conduit to a reservoir and a second position connecting the second and third conduits to the first conduit. With this arrangement, the check valve cooperating with the conduit having the higher pressure fluid will be opened when the valve is in the second position and supply pressured fluid to the cavity. Proper selection of the size of the surface of the valve means in the cavity, and the surfaces respectively in communication with the two flow paths will result in having the valve moved to the second position at any time the pressured fluid is transmitted to the cavity and one flow path has a higher pressure than the other.

All of the above can be accomplished by a simple arrangement of a minimum number of parts, all of which can readily be incorporated into existing fluid translating devices.

BRIEF DESCRIPTION OF SEVERAL VIEWS OF DRAWINGS

FIG. 1 is a fragmentary vertical sectional view of a fluid translating device having the present invention incorporated therein;

FIG. 2 is a transverse sectional view taken generally along line 2—2 of FIG. 1;

FIG. 3 is a view similar to FIG. 2 showing the valve means in its second operative position; and FIG. 4 is a fragmentary view similar to FIG. 3 showing a slightly modified form of the present invention.

DETAILED DESCRIPTION

While this invention is susceptible of embodiment in many different forms, there is shown in the drawings and will herein be described in detail two specific embodiments, with the understanding that the present disclosure is to be considered as an exemplification of the principles of the invention and is not intended to limit the invention to the embodiments illustrated.

FIG. 1 of the drawings discloses a fluid translating device, generally designated by the reference numeral 10. The fluid translating device 10 is illustrated as a fluid motor having a fixed element 12 and a rotatable element 14. The fixed element 12 consists of a stator 16 non-rotatably secured to a fixed support or load bearing member 18 through a spline connection 20 (see FIG. 2). The second or relatively movable element 14 includes an outer member 22 having spaced end plates 24 and 26 fixedly secured to opposite ends thereof.

As more clearly shown in FIG. 2, the outer member 22 cooperates with the inner member 16 to define an annular space. The annular space is divided into a plurality of working chambers 28 by depressions 30 and lobes 32 produced by an irregular contour on the outer peripheral surface of the inner member. While the fluid translating device has been illustrated as including four chambers 28 or referred to as a four lobe type, any number of chambers may be formed between the rotating member and the fixed member which allows for the design of multi-speed and direction translators.

The outer rotating member has a plurality of circumferentially spaced slots 34 extending from the inner surface thereof, each of which slidably supports a vane 36 which is spring biased into engagement with the peripheral surface of the fixed member 16 by suitable mechanism (not shown). In addition, suitable bearings 37 are interposed between the end plates 24 and 26 and the fixed member 12. At least one of the plates 24, 26 is capable of supporting a driven element, such as a wheel secured thereto.

In operation, pressured fluid is delivered through a fluid passage to the working chambers 28 and causes a rotation of the outer member 14 relative to the inner member. The fluid passage consists of first and second ports 40 and 42 extending through the load supporting member 18 and communicating at the inner end thereof with an elongated bore 44 extending through the load supporting member 18. In actual practice, the bore is defined by a sleeve 46 that is fixedly secured into an opening in the load supporting member 18 and extends beyond the spline portion of the load supporting member and through an opening in the stator. Valve means 48 are slidable within the bore and cooperate with the bore to define a first flow path 50 leading from the first port 40 through a plurality of openings 52 into an annular chamber 54. One end of the valve means is closed by a cap 51 that defines part of the first flow path. The peripheral portion of the valve means cooperates with the internal surface of the bore to define a second flow path 56 leading from the second port 42.

The opposite end of the bore communicates with a plurality of axially spaced grooves 60, 62 and 64 through openings 57, 58, and 59. As seen in FIG. 1, the circumferentially extending grooves 60, 62 and 64 are defined on the inner surface of the stator 16 and, the respective annular grooves 60, 62 and 64 are in communication with the respective chambers 28 through axially and circumferentially spaced passageways 70, 72 and 74.

The annular grooves and cooperating passageways are separated into first and second groups adjacent the openings 57, 58 and 59 by a peripheral flange 80 that has its outer surface in sealing engagement with the surface of the bore 44.

An inspection of FIG. 1 reveals that the position of the valve means 48 in the bore 44 will determine the number of passageways that are in communication with the respective flow paths. In the position illustrated in FIG. 1, a first group of passageways 72 and 74 are in communication with the first flow path while the second group of passageways 70 are in communication with the second flow path 56. It may be stated that the flow paths and passageways cooperate to define a fluid passage through the chambers 28. Furthermore, movement of the valve means 48 to the second position shown in FIG. 3 will change the number of passageways in the respective groups described above.

The arrangement of the elements of the valve means is such that the valve means will automatically be in a first position when the members 14 and 16 are rotated relative to each other. Assuming that pressured fluid delivered from a pump (not shown) is connected to the port 40, the pressured fluid will flow through the first flow path 50, the openings 52, the annular chamber 54 through the first group of passageways 72, 74 through the chambers 28 and will be exhausted from the chambers 28 through the second group of passageways 70 and passageway 56 after rotating the outer member through the cooperation with the vanes 36. An inspection of FIG. 3 reveals that a pressurized fluid entering port 40 will be acting upon the surface 81 of the end cap 51 on the remote end of sleeve 49. Thus, any pressure developed in the first flow path 50 will maintain the sleeve or spool 49 and the elements connected thereto in the position shown in FIG. 3. The same will be true if the pressurized fluid is delivered to the port 42 and is exhausted through the port 40. In this instance the pressurized fluid will be acting on the surface 82 of the flange 80 and again will maintain the valve spool in the first position shown in FIG. 3. The first surface 81 that is exposed to the pressure of the fluid in the first flow path 50 and the second surface exposed to the pressure of fluid in the second flow paths 56 may be termed as first means cooperating with the valve means to automatically maintain the valve means in a first position in response to the flow of fluid in the fluid passage.

As was stated above, the valve is moved to a second position by flow control means utilizing the fluid flowing through the fluid passage. This arrangement eliminates the need for any external source of fluid or mechanical connections to actuate the valve means.

Referring to FIG. 1, the bore 44 is closed at its remote end by a cover 84 and cooperates with the end cap 51 on the sleeve 49 to define a cavity or chamber 86. The surface 88 on the end cap 51 cooperates with the first member to define the cavity.

The flow control means for selectively placing the fluid passage in communication with the cavity will now be described. The flow control means is illustrated in FIG. 1 and includes a two-position valve 90 having a first conduit means in communication with the cavity 86. In the illustrated embodiment the first conduit means consists of a first conduit 92 in communication with the cavity 86 through a tube 94 extending through an opening in the closed end cap 51 of the sleeve 44 with the opposite end of the tube fixedly secured to the closed end 96 of the bore 54. The end 96 for the bore has a small opening 98 in communication with the tube 94 and the conduit 92.

The flow control means also has second conduit means connecting the control valve 90 to the fluid passage including the first and second flow paths 50 and 56. The second conduit means consists of second and third conduits 100 and 102 connected to the flow paths 50 and 56. The second and third conduits 100 and 102 respectively have unidirectional valves in the form of one-way check valves 104 and 106 incoporated therein to prevent flow from the control valve to the second and third conduits while accommodating flow from the respective flow paths to the control valve. In addition the control valve 90 has a conduit 108 communicating with a reservoir 110.

In the position shown in FIG. 1 of the drawings, defined by the stop 112 located in the path of movement of the valve means 48, the control valve is in a position to connect the second and third conduits to the first conduit thereby placing the fluid passage, including flow paths 56 and 50, in communication with the cavity 86 whenever either of the check valves is open. Thus, any pressure of fluid developed in either of the flow paths will open the associated check valve and cause fluid to flow into the cavity thereby moving the valve means to its second position shown in FIG. 1. Such a condition will occur anytime there is pressurized fluid flowing through the fluid passageway to rotate the outer member relative to the inner member, because the higher pressure fluid in the fluid passage will be acting on either surface 81 or 82 and will also be acting on surface 88 which is larger than either of the surfaces 81 or 82. This must necessarily be true since the rotation of the two members relative to each other can only occur by delivering pressured fluid to the chambers 28. Assuming that the control valve 90 is now moved to its other operative position, the flow of fluid between conduit 92 and either of conduits 100 and 102 is blocked while the first conduit 92 is placed in communication with the reservoir 110. Upon moving the control valve 90 to its first position, any pressure of fluid in the fluid passage between ports 40 and 42 will force the fluid from cavity 86 into the reservoir 110. This will cause the valve means 48 to move to its position shown in FIG. 3.

While not specifically limited to any configuration, it is desirable to properly size the surfaces 81, 82 and 88. Thus, the surfaces 81 and 82 define areas which are substantially equal to each other while the third surface 88 is substantially greater than the surface area of either of the surfaces 81 and 82. Preferably, the surface 88 is equal in area to the area of the two surfaces 81 and 82.

If the fluid translating device or motor is delivering torque in either the forward or reverse direction by supplying pressured fluid to either port 40 or 42, the pressure of the fluid will act over half of the area of the end on the sleeve 49 to shift the valve 48 to the right as viewed in FIG. 1. Even if the motor is not delivering torque, both surfaces 81 and 82 will be subjected to the charging pressure of the entire system for delivering fluid to either of the flow paths. Thus, for example, when utilizing the fluid motor for driving the wheels of a large tractor, it is customary to maintain a predetermined pressure in the entire closed loop system for delivering fluid to the flow paths 50 and 56 and this pressure of fluid will be acting on both of the surfaces 81 and 82 to cause the valve 48 to move to the first position shown in FIG. 3 whenever the cavity 86 is vented.

With the above construction and arrangement of parts, it will be appreciated that there will always be fluid under pressure in one of the flow paths to maintain the valve means in the first position. However, if the motor is untorqued, there will be no difference between the pressures in the fluid passages and the pressure of fluid on the surfaces 81, 82 and 88 will be equal. Therefore, the valve will not move from its first position to the second position until the pressure of fluid to either port 40 or 42 is increased. If such a delay in moving the valve 48 is not desired, a spring 120 may be placed in the cavity 86, as shown in FIG. 4, and act on the closed end cap 51 to move the valve 48 to the left whenever the valve is hydraulically balanced. Alternatively, the size of the surface area 88 may be increased to be greater than the combined area of the surfaces 81, 82.

If there is no pressurized fluid in the system when the fluid motor is untorqued, the spring 86 would only have to develop a minimum amount of force to overcome the friction developed by the various seals between the bore 44 and the valve 48. Also, if the system is "charged" with a charging pressure, this charging pressure could be developed in the cavity 86 and the pressure would be equal on both sides of the end cap 51. Again there would only be a small spring force required to move the valve 48 to its second position. Preferably the spring would deliver about half as much force as the charging pressure acting over the entire area of the remote end of the valve.

An alternate construction would be to connect conduit 108 into the fluid delivery system for the ports 40 and 42. With such an arrangement, the valve 48 could always be urged to the right whenever torque was delivered by the motor and would be balanced when the motor is untorqued.

The present arrangement insures that there is always a sufficient pressure of fluid to overcome the pressure developed in the various seals between the valve and the bore since the control pressure to the cavity is always equal to the pressure delivered through the flow paths.

What is claimed is:

1. In a fluid translating device having inner and outer members cooperating to define an annular space and being relatively rotatable; means defining a plurality of passageways communicating with said annular space;

and means for directing fluid through said passageways to produce relative rotation of said members comprising: means defining a bore communicating with said passageways, said bore having first and second ports communicating therewith at a location spaced from passageways; valve means slidable in said bore and cooperating with said bore to produce a fluid passage defining first and second flow paths between respective ports and said passageways; and moving means for moving said valve means, said moving means including first means defining surfaces on said valve means exposed to the fluid pressure in said fluid passage to maintain said valve means in a first position in response to the pressure of fluid in said flow paths; and flow control means cooperating with said flow paths to selectively place said flow paths in communication with one end of said valve means to overcome said first means to move said valve means to a second position with the fluid flowing in the fluid passage.

2. A fluid translating device as defined in claim 1, in which said valve means includes a first surface exposed to the pressure of fluid in one of said flow paths, a second surface exposed to the pressure of fluid in the other of said flow paths and a third surface on said end of said valve means, said first and second surfaces being arranged to define said first means to move said valve means to said first position when the fluid in either of said paths is pressurized, said third surface being opposed to said first and second surfaces to move said valve means to said second position when said flow paths are in communication therewith.

3. A fluid translating device as defined in claim 1, in which said valve means includes a sleeve closed at one end and having its opposite end in communication with one of said ports, said sleeve having a peripheral flange engaging said bore with an annular surface of said flange exposed to the fluid in the other of said paths, the opposite surface of said closed end being adapted to be exposed to the fluid in said flow paths.

4. A fluid translating device as defined in claim 1, in which said valve means and said bore cooperate to define a cavity with said control flow means including a conduit communicating with said cavity and a control valve actuatable to supply pressurized fluid from said flow paths to said cavity.

5. A fluid translating device as defined in claim 4, further including second and third conduits connecting said flow paths to said control valve and unidirectional valves cooperating with said second and third conduits accommodating flow from said flow paths to said control valve and preventing flow from said control valve to said second and third conduits; said control valve having a first position blocking flow between said conduits and exhausting the fluid from said first conduit and a second position connecting said second and third conduits to said first conduit.

6. A fluid translating device as defined in claim 4, in which said valve means includes a sleeve having a closed end cooperating with said bore to define said cavity, and an open end communicating with said first port, said sleeve having a peripheral flange having a surface in communication with said second port, said flange being on opposite sides of at least one of said passageways when said valve means is in the respective positions.

7. A fluid translating device as defined in claim 4, in which said valve means has a first surface exposed to the fluid in one of said paths and a second surface exposed to the fluid in the other of said paths with the areas of said surface being substantially equal to each other, and in which said valve means has a third surface having an area substantially greater than either of said first and second surfaces.

8. A fluid translating device as defined in claim 7, further including biasing means in said cavity and acting on said sleeve for moving said sleeve to said second position when the pressure of fluid in said flow paths and said cavity is substantially balanced.

9. A fluid translating device as defined in claim 7, in which said third surface area is substantially equal to the combined area of said first and second surface areas.

10. In a fluid translating device including inner and outer members cooperating to define a working chamber having a plurality of passageways in communication therewith with the flow of fluid through said chamber causing relative rotation between said members; means defining a fluid passage through a first group of said passageways, said chamber and a second group of passageways, said means including valve means automatically maintained in a first position by the pressure of the fluid flowing through said fluid passage and having a surface cooperating with one of said members to define a cavity; and flow control means for selectively placing said fluid passage in communication with said cavity to move said valve means to a second position and change the number of passageways in said first and second groups.

11. A fluid translating device as defined in claim 10, in which said flow control means includes a control valve having first conduit means connecting said valve to said cavity and second conduit means connecting said valve to said fluid passage, said valve having a first position blocking flow between said conduit means and a second position accommodating flow between said conduit means.

12. A fluid translating device as defined in claim 11, in which said flow control means further includes a conduit connecting said valve to a reservoir with said first conduit means in communication with said conduit when said valve is in the first position.

13. A fluid translating device as defined in claim 10, in which said valve means divides said fluid passage into first and second flow paths and has respective surfaces exposed to the pressure of fluid in the respective flow paths and in which said surface of said valve means in said cavity has an area substantially equal to the combined area of the surfaces exposed to said flow paths and the areas of the surfaces exposed to the respective flow paths are approximately equal to each other.

14. A fluid translating device as defined in claim 13, further including a spring in said cavity and acting on said surface in said cavity to move said valve means to said second position when said flow control means places said fluid passage in communication with said cavity and no pressure difference exists.

15. A fluid translating device as defined in claim 13, in which said flow control means includes a control valve; a first conduit connecting said valve to said cavity; second and third conduits connecting said flow paths to said valve and each having a check valve preventing flow from the control valve to the flow paths, said control valve having a first position blocking flow from the second and third conduits to the first conduit and a second position accommodating such flow.

* * * * *